United States Patent [19]

Clerc

[11] Patent Number: 4,759,609

[45] Date of Patent: Jul. 26, 1988

[54] PROCESS FOR THE SEQUENTIAL CONTROL OF A LIQUID CRYSTAL MATRIX DISPLAY MEANS HAVING DIFFERENT OPTICAL RESPONSES IN ALTERNATING AND STEADY FIELDS

[75] Inventor: Jean-Frédéric Clerc, Saint Egreve, France

[73] Assignee: Comminnsariat a l'Energie Atomique, Paris, France

[21] Appl. No.: 26,471

[22] Filed: Mar. 16, 1987

[30] Foreign Application Priority Data

Mar. 18, 1986 [FR] France ................................ 86 03824

[51] Int. Cl.[4] .......................... G02F 1/13; G09G 3/36

[52] U.S. Cl. ..................................... 350/333; 350/346; 350/331 R; 350/336; 340/784

[58] Field of Search .................... 350/331 R, 336, 346, 350/333; 340/805, 811, 784

[56] References Cited

U.S. PATENT DOCUMENTS

| | | | |
|---|---|---|---|
| 3,675,988 | 7/1972 | Soref | 350/336 |
| 3,854,072 | 12/1974 | Trogdon | 340/805 |
| 4,082,430 | 4/1978 | Schulthess et al. | 340/805 |
| 4,392,718 | 7/1983 | Morrison | 350/331 R |

FOREIGN PATENT DOCUMENTS

| | | | |
|---|---|---|---|
| 0123981 | 11/1984 | European Pat. Off. | 350/346 |

OTHER PUBLICATIONS

Displays, vol. 7, Jan. 1986, pp. 3 to 11.

*Primary Examiner*—Stanley D. Miller
*Assistant Examiner*—Trong Quang Phan
*Attorney, Agent, or Firm*—Cesari and McKenna

[57] ABSTRACT

A process for the sequential control of a liquid crystal display means having different optical responses in alternating and steady fields. This process consists of applying to one side of a first electrode an a.c. potential $V_1$ and to the other side an a.c. potential $V_2$, with $V_2-V_1$ constant, so that only line Y parallel to the sides of the first electrode is exposed to a reference potential $V_0$; applying to one side of a second electrode an a.c. potential $V_3$ and to the other side an a.c. potential $V_4$, with $V_4-V_3$ constant, so that only the line X parallel to the sides of the second electrode, intersecting the first, is exposed to $V_0$; and applying a d.c. potential $V_5$ to the two sides of one electrode, so that liquid crystal zone XY defined by the intersection of lines X and Y is only subject to potential $V_5$ and that outside the zone the liquid crystal is subject to an a.c. potential difference, the displayed state of the zone resulting from a positive polarity of $V_5$, the undisplayed state resulting from a negative polarity of $V_5$ and the maintaining of a state resulting from the elimination of $V_5$.

5 Claims, 2 Drawing Sheets

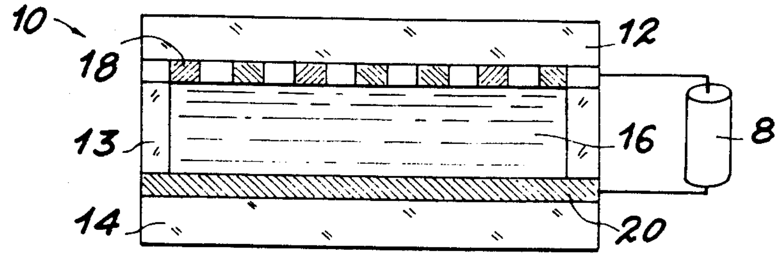
FIG. 1 PRIOR ART
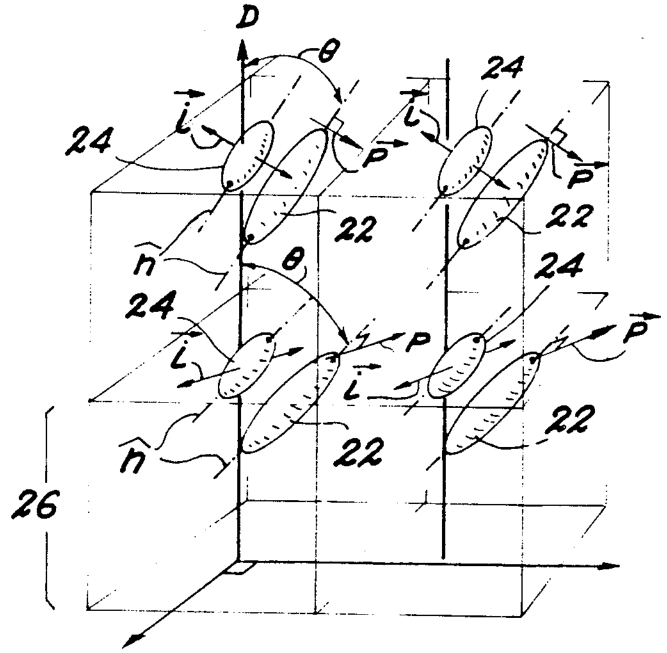
FIG. 2 PRIOR ART
FIG. 3 PRIOR ART
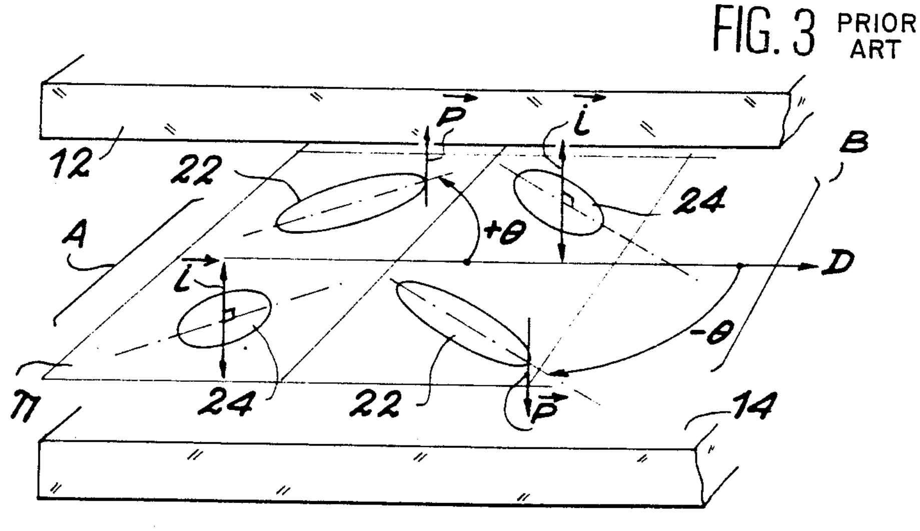

PROCESS FOR THE SEQUENTIAL CONTROL OF A LIQUID CRYSTAL MATRIX DISPLAY MEANS HAVING DIFFERENT OPTICAL RESPONSES IN ALTERNATING AND STEADY FIELDS

BACKGROUND OF THE INVENTION

The present invention relates to a process for the sequential control of a liquid crystal matrix display means having different optical responses in alternating and steady electric fields. It is used in optoelectronics in the production of the liquid crystal displays used as converters of electrical informations into optical informations and for the binary display of complex images or alphanumeric characters.

More specifically, the invention relates to the sequential control of a matrix display means incorporating a display cell containing a ferroelectric liquid crystal and having negative dielectric anisotropy, while having different optical responses for a.c. and d.c. exciting signals. Hitherto this type of liquid crystal is the only one having different optical responses in alternating and steady fields.

Such liquid crystals are generally obtained by mixing a ferroelectric chiral smectic liquid crystal C and a smectic or cholesteric nematic liquid crystal A having a negative dielectric anisotropy.

FIG. 1 shows in longitudinal section a display cell containing such a liquid crystal. This display cell 10 is formed from two transparent insulating walls 12, 14, which are generally made from glass. These parallel walls are joined at their edges by means of a weld 13 serving as a sealing joint.

Display cell 10 contains a mixture of liquid crystals 16 containing a ferroelectric chiral smectic liquid crystal C and a nematic liquid crystal with negative dielectric anisotropy. A nematic liquid crystal with negative dielectric anisotropy is generally obtained by grafting in the core of the molecules of the nematic liquid crystal an electronegative group, e.g. a halogen, such as chlorine.

The inner face of wall 12 of cell 10 is covered with m parallel conductive strips 18 serving as the row electrodes. In the same way, the inner face of the cell wall 14 is covered with n parallel conductive strips 20 serving as the column electrodes. As the row and column electrodes intersect, each intersection defines an elementary zone of the liquid crystal, whose electrooptical property can be selectively excited. The different elementary display zones are distributed in matrix form. These row and column electrodes 18, 20 are connected to an electric power supply 8, so that an electric field can be applied to one or more liquid crystal zones.

FIG. 2 shows the structure of the molecules of the liquid crystal mixture 16. Molecules 22 are those of the ferroelectric chiral smectic liquid crystal C and molecules 24 are those of the nematic liquid crystal with negative dielectric anisotropy.

The molecules 22 are elongated and arranged in parallel layers. Molecules 22 have the same orientation $\vec{n}$ in the same layer. The longitudinal axis of the molecules 22 of the same layer 26 is inclined by an angle $\vec{\theta}$ with respect to the normal to layers 26, designated $\vec{D}$. Each molecule 22 has an electric dipole $\vec{p}$ perpendicular to direction $\vec{n}$ of molecules 22 and parallel to layers 26. The molecular direction n and the dipole $\vec{p}$ precess about the normal $\vec{D}$ from one layer 26 to the other.

Molecules 24 are also elongated and their molecular orientation and layer-form distribution are imposed by those of the molecules 22. Therefore molecules 24 are parallel to molecules 22 in the same layer. Each molecule 24 has an electric dipole $\vec{i}$ perpendicular to molecular direction n.

FIG. 3 shows the two possible orientations of the molecules of liquid crystal mixture 16. With reference to FIG. 3, an explanation will now be given of the behaviour of molecules 22 and 24 of mixture 16 in the presence of an electric field applied thereto.

The two possible orientations A and B are defined with respect to the normal of layers $\vec{D}$. These two orientations A and B are in a longitudinal plane $\pi$ parallel to the plane of the two walls 12, 14 of the display cell. In the first orientation A, molecules 22 and 24 are inclined by an angle $+\theta$ with respect to direction $\vec{D}$ and the electric dipole $\vec{p}$ is oriented from bottom to top in FIG. 3.

In the second orientation B, molecules 22 and 24 are inclined by an angle $-\theta$ relative to directoion $\vec{D}$ and the electric dipole $\vec{p}$ is oriented from top to bottom in FIG. 3.

When an alternating electric field $\vec{E_S}$ is produced between electrodes 18 and 20 of display cell 10 containing mixture 16, molecules 22 and 24 are subject to a torque or moment $\vec{\Gamma_S}$ tending to align the dipoles of the molecules with the alternating field $\vec{E_S}$. Torque $\Gamma_S$ is a restoring torque. The prior orientation A or B of molecules 22 and 24 is retained. Dipole $\vec{i}$ serves as a stabilizer by aligning parallel with said field $\vec{E_S}$.

When a steady magnetic field $\vec{E_C}$ is produced between electrodes 18 and 20 of the display cell 10 containing liquid crystal 16, the dipoles of molecules 22 and 24 are subject to a moment or torque $\vec{\Gamma_C}$ tending to align molecules 22 and 24 with the steady field $\vec{E_C}$. This torque $\vec{\Gamma_C}$ is a tilting moment. Molecules 22, 24, previously oriented either in accordance with A or B are oriented according to the same direction A or B. The orientation obtained is that for which the electric dipole p is oriented parallel to field $\vec{E_C}$ and in the same sense as the latter. Thus, dipole $\vec{p}$ serves as a destabilizer.

Numerous processes for the sequential control of a liquid crystal matrix display means are known, like those described hereinbefore using a.c. or d.c. exciting signals for locally controlling the electrooptical property of said liquid crystals. However, these processes unfortunately require m+n control circuits or connections for displaying a matrix of m×n elementary display zones defined by the intersection of m row electrodes and n column electrodes. Moreover, the use of a direct current progressively deteriorates the liquid crystal.

The present invention relates to process for the sequential control of a liquid crystal matrix display means only requiring four control circuits and connections for the display of a random number of elementary display zones. This process is based on the use of an in particular ferroelectric liquid crystal with negative dielectric anisotropy having different optical responses for the a.c. and d.c. exciting signals.

SUMMARY OF THE INVENTION

The present invention specifically relates to a process for the sequential control of a matrix display means comprising a liquid crystal inserted between the first and second electrodes in the form of continuous conductive strips, said crystal having an electrooptical property, being formed from elementary zones distributed in the form of matrixes, whereof it is possible to selectively excite the electrooptical property with a view to obtaining a displayed state or an undisplayed state, said liquid crystal having different optical responses for a.c. and d.c. exciting signals, and means for supplying said exciting signals to the electrodes, wherein there are two electrodes, each having first and second parallel sides, the electrooptical property of an elementary zone XY corresponding to the overlap of an ordinate line Y, parallel to the first and second sides of the first electrode and contained in the latter and an abscissa line X parallel to the first and second sides of the second electrode and contained in the latter is controlled, by applying to the first side of the first electrode a first a.c. potential $V_1$ superimposed on a first reference potential $V_0$ and to the second side of the first electrode a second a.c. potential $V_2$ superimposed on potential $V_0$ with $V_2-V_1$ constant, in order that the ordinate line Y is subject to potential $V_0$ and that outside said line, the first electrode is subject to a potential differing from $V_0$, by applying to the first side of the second electrode a third a.c. potential $V_3$ superimposed on a second reference potential $V'_0$ and to the second side of the second electrode a fourth a.c. potential $V_4$ superimposed on potential $V'_0$ with $V_4-V_3$ constant, so that the abscissa line X is subject to potential $V'_0$ and that outside said line, the second electrode is subject to a potential differing from $V'_0$ and by applying a fifth d.c. potential $V_5$ to the two sides of one of the electrodes, said potential being such that zone XY is only subject to said d.c. potential $V_5$ and that outside zone XY the liquid crystal is subject to an a.c. potential difference, the displayed state of zone XY being obtained by a positive polarity of the fifth potential $V_5$, the undisplayed state of zone XY being obtained by a negative polarity of the fifth potential $V_5$ and the maintaining of the displayed or undisplayed state of zone XY being obtained by eliminating the fifth potential.

It is possible to use a ferroelectric liquid crystal with a negative dielectric anisotropy as the liquid crystal having different optical responses for the a.c. and d.c exciting signals.

Through the use of two electrodes, the inventive process makes it possible to reduce the number of connections and control circuits, particularly due to the use of a liquid crystal having different optical properties for d.c. and a.c. exciting signals. This process permits a point-by-point control of the liquid crystal zone useful for the display.

According to a special embodiment, the second reference potential Vo' is equal to the first reference potential Vo.

In order to simplify the control, the a.c. potentials $V_1$ and $V_2$ applied to the first electrode are advantageously in phase opposition. In the same way, the a.c. potentials $V_3$ and $V_4$ applied to the second electrode are in phase opposition.

In order that the elementary display zones are as small as possible, preferably the a.c. potentials $V_1$ and $V_2$ have one frequency fa and the a.c. potentials $V_3$ and $V_4$ a different frequency fb which is not a multiple of fa. Thus, the smaller the elementary zones, the better the definition of the image formed on the complete cell.

In order to simplify the control process $V_1$, $V_2$, $V_3$ and $V_4$ are advantageously a.c. potentials with zero mean values, $V_1$, $V_2$, $V_3$ and $V_4$ then representing the effective values of said potentials.

BRIEF DESCRIPTION OF THE DRAWINGS

The invention is described in greater detail hereinafter relative to non-limitative embodiments and the attached drawings, wherein show:

FIG. 1 already described, diagrammatically and in longitudinal section, a prior art liquid crystal display means.

FIG. 2 already described, diagrammatically the structure of the molecules of a ferroelectric liquid crystal mixture with negative dielectric anisotropy.

FIG. 3 already described, diagrammatically the two possible orientations of the molecules of a ferroelectric liquid crystal mixture with negative dielectric anisotropy, as a function of the nature and polarity of the electric field applied thereto.

DETAILED DESCRIPTION OF THE PREFERRED EMBODIMENTS

Figure 4:
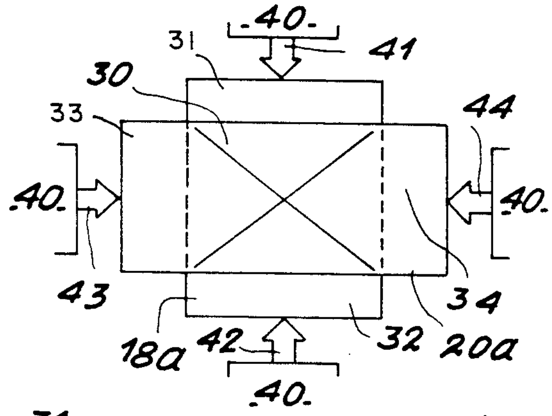
FIG. 4 Part of a display means controlled according to the invention, showing the arrangement of the electrodes.

FIG. 4 shows part of a display means to which is applied the control process according to the invention. Said means only differs from those of the prior art shown in FIG. 1 through the use of two electrodes 18a and 20a. The other components of the display cell are given the same references as in FIG. 1. In uniform manner, electrodes 18a and 20a respectively cover most of the transparent walls 12 and 14 of display cell 10.

Electrodes 18a and 20a are obtained by the deposition of a continuous conductive strip having no pattern. They can be produced from tin and indium oxide, which is transparent. Electrodes 18a and 20a are arranged in facing perpendicular manner. The crossing or intersection zone 30 of these two electrodes defines the useful area for the display. Electrodes 18a, 20a extend beyond useful area 30, so that it is possible to electrically connect the sides of electrodes 18a, 20a to known control circuits 40 supplying the a.c. or d.c. exciting signals.

For connecting these control circuits 40 to electrodes 18a, 20a, electric contacts 41, 42 are placed on the first side 31 and second side 32 respectively of electrode 18a. In the same way, electric contacts 43, 44 are placed on the first side 33 and second side 34 respectively of electrode 20a.

The liquid crystal whose electrooptical property is to be excited for obtaining a display by the process according to the invention is, as in the prior art, in the form of a 0.5 to 30 μm film, inserted between the two electrodes 18a and 20a. The liquid crystal is formed from a mixture containing a ferroelectric liquid crystal, such as hexyloxybenzylidene-p'-amino-2-chloropropylcinnamate and a liquid crystal with negative dielectric anisotropy, such as 4-ethoxy-4'-hexyloxy-α-cyanostylbene.

A description will now be given of the sequential control process according to the invention using the electrode structure described hereinbefore relative to FIGS. 5 and 6.

Figure 5:
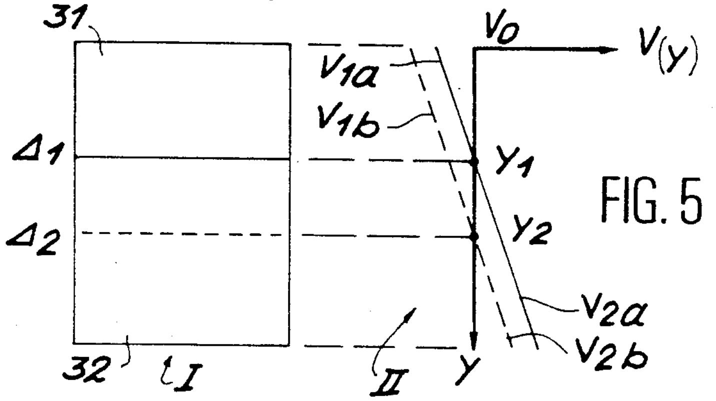
FIG. 5 A diagrammatic view explaining the obtaining of the ordinate line Y serving for the display, according to the invention, of an elementary zone XY.

FIG. 5 is a diagrammatic view explaining the obtaining of an ordinate line Y parallel to the sides 31, 32 of electrode 18a. Line Y is perpendicular to an abscissa line X (FIG. 6) parallel to sides 33, 34 of electrode 20a.

The intersection of the two lines X and Y defines an elementary display zone XY in the same way in which this is done by a row electrode and a column electrode of a crossbar matrix means as described relative to FIG. 1.

Part I of FIG. 5 shows line Y carried by electrode 18a of display cell 10. Part II thereof shows the potentials used for the formation of line Y on an orthonormalized reference mark having as the ordinate Y and the abscissa V(Y).

For controlling the ordinate line Y, firstly and by means of the control circuit 40 connected to electric contact 31 placed on side 31 of electrode 18a, is applied a first a.c. potential $V_1$ superimposed on a reference d.c. potential $V_0$. Using the control circuit 40 connected to electric contact 42 placed on the side 32 of electrode 18a is then applied a second a.c. potential $V_2$ superimposed on the d.c. potential $V_0$, $V_2$ and $V_1$ being such that $V_2-V_1$ is constant.

$V_2$ and $V_1$ are a.c. potentials with zero mean values and are preferably in phase opposition for control simplicity purposes. However, without passing beyond the scope of the invention, it is possible to apply potentials $V_1$ and $V_2$ which are in phase. $V_1$ and $V_2$ have a frequency equal to fa, which can vary from 25 Hz to 100 kHz. As can be seen in part II of FIG. 5, $V_2$ and $V_1$ surround the reference potential $V_0$. Ordinate line Y parallel to sides 31, 32 of electrode 18a is consequently exposed to potential $V_0$. Outside said line, electrode 18a is exposed to a potential differing from $V_0$.

By varying the values of $V_2$ and $V_1$ around $V_0$, while still respecting the condition $V_2-V_1$ constant, it is possible to move line Y raised to reference potential $V_0$ from one side to the other of the first electrode 18a, which makes it possible to define the different elementary display zones, distributed in matrix form, in the same way as with the row and column electrodes of the prior art.

In the illustrated case is shown a line $\Delta_1$ of ordinate $Y_1$ obtained by applying potentials $V_{1a}$ and $V_{2a}$ and a line $\Delta_2$ of ordinate $Y_2$ obtained by applying potentials $V_{1b}$ and $V_{2b}$, $V_{2a}-V_{1a}$ being equal to $V_{2b}-V_{1b}$.

Figure 6:
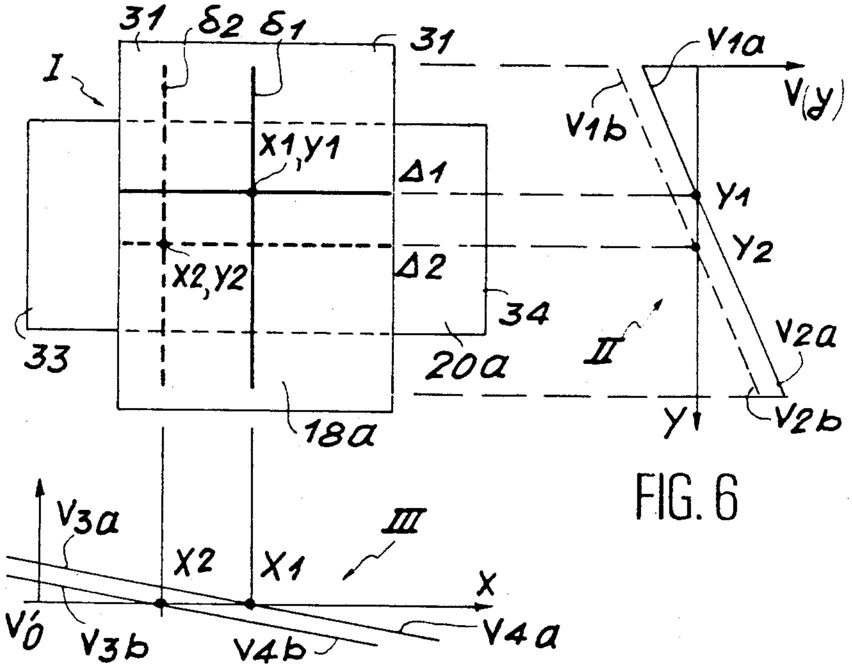
FIG. 6 A diagrammatic view explaining the inventive control of an elementary zone XY.

FIG. 6 is a diagrammatic view explaining the control according to the invention of an elementary zone XY, defined by the intersection of ordinate line Y, formed as hereinbefore and an abscissa line X, formed in a similar manner.

Part I of FIG. 6 shows electrodes 18a, 20a, which intersect and face one another. In part II thereof is shown, and as described with reference to part II of FIG. 5, potentials $V_2$ and $V_1$ making it possible to expose line Y to potential $V_0$. Part III of FIG. 6 shows the potentials used for the formation of line X on an orthonormalized reference mark having the ordinate V(X) and the abscissa (X).

For controlling abscissa line X parallel to sides 33, 34 of electrode 20, by means of the control circit 40 connected to electric contact 43 placed on side 33 of electrode 20a, is firstly applied a third a.c. potential $V_3$ superimposed on a reference potential $V'_0$, which can be the same or different from $V_0$ and is e.g. equal to zero.

By means of control circuit 40 connected to electric contact 44 on side 34 of electrode 20a is then applied a fourth a.c. potential $V_4$ superimposed on $V'_0$, $V_4$ and $V_3$ being such that $V_4-V_3$ is constant, e.g. equal to 20 V. $V_4$ and $V_3$ are a.c. potentials with zero mean values. $V_4$ and $V_3$ are preferably in phase opposition and have a frequency fb, which is different and not a multiple of fa and which can range from 25 Hz to 100 kHz.

As can be seen from part III of FIG. 6, $V_3$ and $V_4$ surround the reference potential $V'_0$. Abscissa line X parallel to sides 33, 34 of electrode 20a is consequently subject to potential $V'_0$. Outside said line, electrode 20a is subject to a potential differing from $V'_0$.

By varying the values of $V_4$ and $V_3$, independently of those of $V_1$ and $V_2$ about $V'_0$, while still respecting the condition $V_4-V_3$ constant, it is possible to move line X raised to reference potential $V'_0$ from one end to the other of the second electrode 20a. In the illustrated case is shown a line $\delta_1$ of abscissa $X_1$ obtained by applying potentials $V_{3a}$ and $V_{4a}$ and a line $\delta_2$ of abscissa $X_2$ obtained by applying potentials $V_{3b}$ and $V_{4b}$, $V_{4a}-V_{3a}$ being equal to $V_{4b}-V_{3b}$.

For $V_1$, $V_2$, $V_3$ and $V_4$ which are given, there is consequently an elementary zone XY, such that at the terminals of the ferroelectric liquid crystal with negative dielectric anisotropy, there is the reference potential $V_0$ on electrode 18a and reference potential $V'_0$ on electrode 20a.

At zone XY of the liquid crystal, when $V_0=V'_0$, the alternating field resulting from the four a.c. potentials has a zero mean value. Outside this zone, the resultant alternating field $\vec{E_S}$ of the four a.c. potentials has a non-zero mean value. In the illustrated case is shown a zone $X_1Y_1$ defined by the overlap of a line $\Delta_1$ of ordinate $Y_1$ obtained by applying potentials $V_{1a}$ and $V_{2a}$ and a line $\delta_1$ of abscissa $X_1$ obtained by applying potentials $V_{3a}$ and $V_{4a}$ and a zone $X_2Y_2$ defined in similar manner by the overlap of a line $\Delta_2$ of ordinate $Y_2$ obtained by applying potentials $V_{1b}$ and $V_{2b}$ and another line $\delta_2$ of abscissa $X_2$ obtained by applying potentials $V_{3b}$ and $V_{4b}$.

For controlling the electrooptical property of the elementary zone XY defined hereinbefore, a fifth d.c. potential $V_5$ between 1 and 20 V is applied to the two sides of one or other of the electrodes 18a and 20a via control circuits 40 connected to the corresponding electric contacts of the electrode. Potential $V_5$ is such that zone XY is only subject to said d.c. potential $V_5$. In other words, in zone XY, the liquid crystal only sees the d.c. potential $V_5$, because the resultant alternating field $\vec{E_S}$ produced by the four a.c. potentials has a zero mean value. However, outside zone XY, the liquid crystal sees at its terminals an a.c. potential difference resulting from potentials $V_1$, $V_2$, $V_3$, $V_4$ and $V_5$.

For an appropriate choice of $V_5$, the fineness of zone XY is defined. In the same way, a sufficiently high resultant alternating field $\vec{E_S}$ in zone XY means that the latter does not have to extend over the entire display-useful zone 30.

The displayed state of zone XY (light on dark background) is obtained for a positive polarity of the fifth d.c. potential $V_5$ applied to the sides of one of the electrodes, e.g. sides 31, 32 of electrode 18a, whilst the other electrode, e.g. 20a is not subject to any d.c. potential. The undisplayed state (dark) of zone XY is obtained when the polarity of the fifth potential $V_5$ is e.g. applied to the negative electrode 18a, whereas the other electrode 20a is not exposed to any d.c. potential.

The maintenance of the displayed or undisplayed state of zone XY is obtained by eliminating the fifth potential $V_5$ applied. The other elementary zones remain in their displayed or undisplayed optical state.

An explanation will now be given as to how the different potentials $V_1$ to $V_5$ act on the orientation of the molecules 22, 24 of the mixture of ferroelectric liquid crystals with negative dielectric anisotropy. Under the simultaneous action of a steady field $E_C$ due to the d.c. potential $V_5$ and the alternating field $E_S$ resulting from the a.c. potentials $V_1$, $V_2$, $V_3$ and $V_4$, electric dipoles i and $\vec{p}$ reciprocally of molecules 22, 24 of zone XY of liquid crystal mixture 16 are subject to torque $\vec{\Gamma}_S$ tending to align the dipoles of molecules 22, 24 with alternating field $E_S$ and torque $\Gamma_C$ tending to align the dipoles of molecules 22, 24 with the steady field $\vec{E}_C$.

Consequently, the resultant torque $\vec{\Gamma}$ exerted on molecules 22, 24 is the geometric sum of torques $\vec{\Gamma}_S$ and $\vec{\Gamma}_C$. Torque $\vec{\Gamma}_S$ is a restoring torque and is proportional to the sum raised to the square of the steady and alternating fields, i.e. $\vec{\Gamma}_S=\alpha(\vec{E}_S+\vec{E}_C)^2$, $\alpha$ being a proportionality coefficient. In the same way, moment $\vec{\Gamma}_C$ is a tilting moment and is proportional to the steady field $\vec{E}_C$, i.e. $\vec{\Gamma}_C=\beta\vec{E}_C$ $\beta$ being a proportionality coefficient.

Thus, the resultant torque is given by the equation:

$$\vec{\Gamma}=\alpha(\vec{E}_S+\vec{E}_C)^2\pm\beta\vec{E}_C$$

If the inequation $\alpha(\vec{E}_S+\vec{E}_C)^2>|\beta.\vec{E}_C|$ is proved, the resultant torque $\vec{\Gamma}$ exerted on molecules 22 and 24 of zone XY is a restoring torque. The prior orientation A or B (FIG. 3) of molecules 22, 24 is retained. Thus, the displayed or undisplayed optical state of elementary display zone XY is not modified, which corresponds to the storage of the image.

However, if the inequation $\alpha(\vec{E}_C+\vec{E}_C)^2<|\beta\vec{E}_C|$ is proved, the resultant moment $\vec{\Gamma}$ exerted on molecules 22, 24 of zone XY is a tilting moment in accordance with the sense of the steady field $\vec{E}_C$ applied. The molecules previously arranged in accordance with the two orientations A or B (FIG. 3) are oriented with the same orientation A or B. This collective orientation is that for which the electric dipole $\vec{p}$ is oriented parallel to field $\vec{E}_C$ and in the same sense as the latter. Thus, the displayed or undisplayed optical state of the elementary display zone XY is modified, which corresponds to the writing of the image.

The control process according to the invention can be realized by using the same control circuits as those used in conventional point-to-point control processes for a liquid crystal matrix display.

The above description has been given in an explanatory and non-limitative manner and all modifications can be envisaged without passing beyond the scope of the invention. Thus, the liquid crystal may only be formed from a single crystal, provided that it has different optical responses in steady and alternating fields. Moreover, one of the electrodes can be opaque, the display means then functioning in reflection.

What is claimed is:

1. A process for the sequential control of a matrix display means comprising a liquid crystal inserted between the first and second electrodes in the form of continuous conductive strips, said crystal having an electrooptical property, being formed from elementary zones distributed in the form of matrixes, whereof it is possible to selectively excite the electrooptical property with a view to obtaining a displayed state or an undisplayed state, said liquid crystal having different optical responses for a.c. and d.c. exciting signals, and means for supplying said exciting signals to the electrodes, wherein there are two electrodes, each having first and second parallel sides, the electrooptical property of an elementary zone XY corresponding to the overlap of an ordinate line Y, parallel to the first and second sides of the first electrode and contained in the latter and an abscissa line X parallel to the first and second sides of the second electrode and contained in the latter is controlled, by applying to the first side of the first electrode a first a.c. potential $V_1$ superimposed on a first reference potential $V_0$ and to the second side of the first electrode a second a.c. potential $V_2$ superimposed on potential $V_0$ with $V_2-V_1$ constant, in order that the ordinate line Y is subject to potential $V_0$ and that outside said line, the first electrode is subject to a potential differing from $V_0$, by applying to the first side of the second electrode a third a.c. potential $V_3$ superimposed on a second reference potential $V'_0$ and to the second side of the second electrode a fourth a.c. potential $V_4$ superimposed on potential $V'_0$ with $V_4-V_3$ constant, so that the abscissa line X is subject to potential $V'_0$ and that outside said line, the second electrode is subject to a potential differing from $V'_0$, and by applying a fifth d.c. potential $V_5$ to the two sides of one of the electrodes, said potential being such that zone XY is only subject to said d.c. potential $V_5$ and that outside zone XY the liquid crystal is subject to an a.c. potential difference, the displayed state of zone XY being obtained by a positive polarity of the fifth potential $V_5$, the undisplayed state of zone XY being obtained by a negative polarity of the fifth potential $V_5$ and the maintaining of the displayed or undisplayed state of zone XY being obtained by eliminating the fifth potential.

2. A control process according to claim 1, wherein the second reference potential $V'_0$ is equal to the first reference potential $V_0$.

3. A control process according to claim 1, wherein the a.c. potentials $V_1$ and $V_2$ are in phase opposition and wherein the a.c. potentials $V_3$ and $V_4$ are also in phase opposition.

4. A control process according to claim 1, wherein the a.c. potentials $V_1$ and $V_2$ have a frequency fa and wherein the a.c. potentials $V_3$ and $V_4$ have a frequency fb differing from and being a non-multiple of fa.

5. A control process according to claim 1, wherein $V_1$, $V_2$, $V_3$, and $V_4$ are a.c. potentials with zero mean values.

* * * * *